UNITED STATES PATENT OFFICE.

AUGUSTE MARIE MICHEL, OF PARIS, FRANCE.

MANUFACTURE OF ACCUMULATOR-PLATES.

SPECIFICATION forming part of Letters Patent No. 489,316, dated January 3, 1893.

Application filed August 24, 1892. Serial No. 444,013. (No specimens.)

*To all whom it may concern:*

Be it known that I, AUGUSTE MARIE MICHEL, of Paris, in the Department of the Seine and the Republic of France, have invented a new and useful Improvement in the Manufacture of Accumulator-Plates, which is fully set forth in the following specification.

The object of this invention is to produce lead in a spongy, frothy, or foamy condition so that when subsequently compressed to a certain degree it shall maintain its cellular structure but be greatly condensed. I effect this object by proceeding in the following manner:—(First) An alloy of lead and another metal, such as zinc, which is capable of elimination, is formed in the proportion deemed advisable, or suitable for the purpose, preferably ninety-six parts of lead to four of zinc, by weight. (Second) The alloy thus formed is disintegrated by mechanical or physical means *i. e.*, it may be reduced by cutting tools to shavings, gratings, &c., or it may be reduced by first melting, and agitating the mass while cooling, so as to reduce it to a granular or pulverulent mass. (Third) The alloy thus reduced to a state of division is treated by an acid, preferably sulphuric acid, the effect of which is to combine with the zinc forming a soluble sulphate of zinc which can afterward be eliminated by washing. Other means of elimination may be resorted to, such as electrolysis, *i. e.*, in an acidulated bath forming therein with a metal plate (for instance copper) a negative pole is placed, upon which the zinc after decomposition will be deposited. The last operation has for its effect the formation in and throughout the mass of an immense quantity of gas, which causes a foaming or frothing, and distending the mass by the formation of cells, with thin walls which do not collapse, but are easily compressible, even by hand. This honey-combed lead is employed for the manufacture of accumulator plates as follows:—It may be spread upon lead plates or supports (in which case there being no adhesion the plate would have to be kept in a horizontal position) or it may be slightly compressed (by pressure not to exceed fifty kilos per square centimeter) into the spaces of skeleton supports,—or between two or more such supports, forming intermediate cushions as it were, or into forms of briquettes which may be filled into the spaces of corresponding shape left in the support for the reception of the active material; or the briquettes may be strung upon or between lead rods, which may be clamped together to form a plate. The briquettes may also be placed in molds in which the frame or support is left to be formed around the briquettes by the molten lead to be poured into the mold. Other methods may be found expedient to make plates with this substance, an essential point being that it shall be properly exposed to the action of the liquid of the accumulator, so as to pervade throughout the whole mass. I have heretofore attempted to accomplish this result by forming the mass by compression of granular or pulverulent lead and zinc alloy, and eliminating therefrom the zinc; but I have found that the effect of elimination from the compressed mass is a tendency to explode and break up the mass, so as to render it liable when exposed to the action of the liquor, to crumble and to detach particles, or break up and drop to the bottom of the accumulator vessel.

Plates constructed as herein described retain their adhesiveness during the operation of the battery, and another important advantage of the invention is that I now use a maximum pressure of fifty kilos per square centimeter; whereas formerly it was necessary to use a pressure of from four to six times greater. Great economy in power and tools is effected.

I claim as my invention:—

The described process of making active material for electric accumulators, by forming an alloy of lead and other metal, such as zinc, disintegrating or reducing the alloy, eliminating the metal alloyed with the lead and leaving the latter in a porous, distended condition, and finally compressing the lead into the desired form, substantially as described.

In testimony whereof I have signed this specification in the presence of two subscribing witnesses.

AUGUSTE MARIE MICHEL.

Witnesses:
   A. POLLOK,
   GEORGE R. OSTHEIMER.